May 2, 1939.     H. NIEDERREITHER     2,157,090
METHOD OF INSULATING ELECTROLYTIC APPARATUS OPERATED UNDER PRESSURE
Filed March 31, 1937
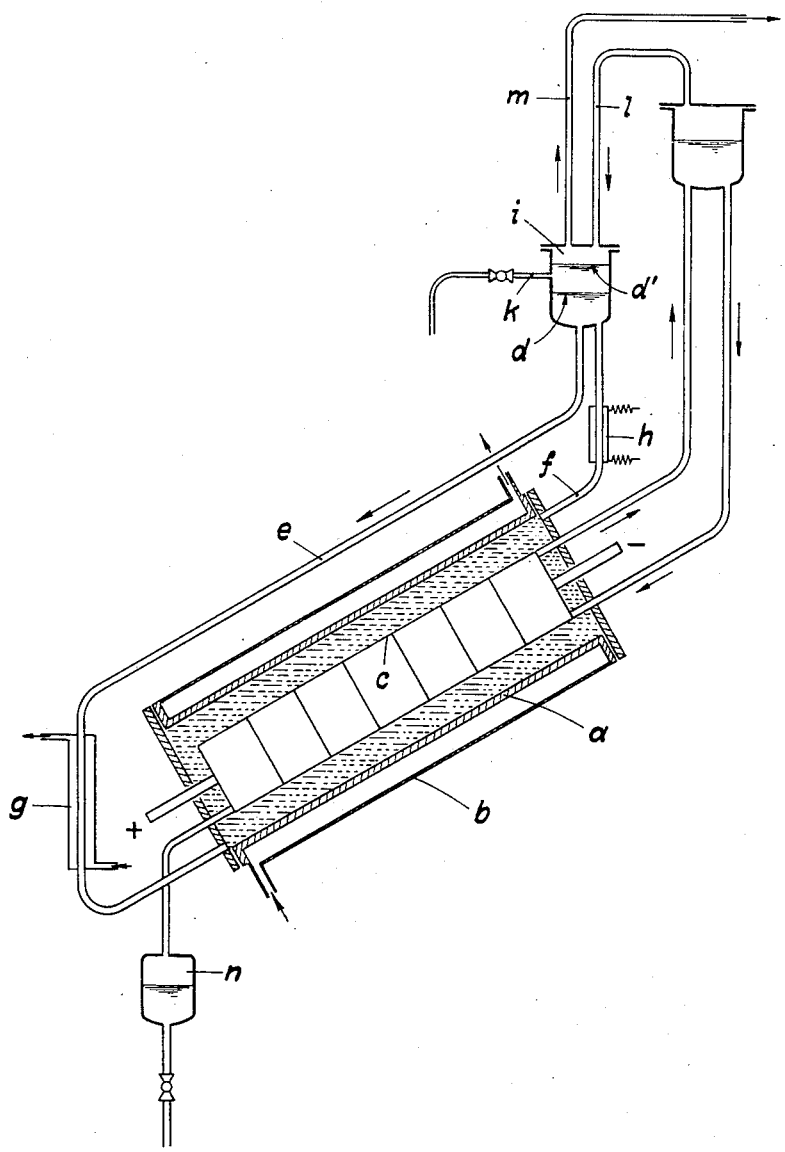
Inventor:
Hans Niederreither
By: Mason & Porter
Attorneys Patented May 2, 1939

2,157,090

UNITED STATES PATENT OFFICE 2,157,090

METHOD OF INSULATING ELECTROLYTIC APPARATUS OPERATED UNDER PRESSURE

Hans Niederreither, Munich, Germany

Application March 31, 1937, Serial No. 134,152
In Germany March 30, 1936

1 Claim. (Cl. 204—5)

The invention relates to a method for insulating live or energized structural members.

In live or energized structural members which are insulated relatively to one another or to the ground, e. g. to a grounded container, for instance by oil, deposited solid or liquid, conductive substances will often result in shunting or short-circuiting. These inconveniences will arise particularly frequently in devices in which such energized structural members contain solid and liquid substances of this description and the same are by leaks of the structural members allowed to penetrate into the space filled with the liquid insulating material.

It is pointed here e. g. to electrolyzers, particularly pressure decomposers, in which the energized cell body is housed in a case, e. g. a pressure container and the intermediate space is filled with a liquid insulating material. When the insulating material is lighter than the emerging electrolyte, the emerging electrolyte will, as is well-known, migrate downwards, and if it is heavier, the electrolyte will migrate upwards. The electrolyte however frequently emerges in the form of drops which may according to the emerging quantity arrive at a rather substantial magnitude and therefore be able to bridge large insulating gaps. Apart from this solid impurities already existent or newly formed may act as bridges by which, in the same way as by the large electrolyte drops, heavy shunting and short-circuiting may be produced.

Insulating paints and also coats on the said structural members will not result in appreciable improvements, since they are porous from the beginning or get so in the course of time, apart from the fact that mechanical or chemical attacks may create weak points which continually increase.

According to the present invention these drawbacks are obviated by the insulating material being cooled down so much on one or both of the structural members insulated relatively to each other that on the wall of the member the liquid insulating material is converted into a solid or at least tough or viscous layer of insulating material. For cooling down the member concerned there may, according to the setting point of the particular insulating material, be used tap water or a refrigerating agent produced by a refrigerating machine. On the wall cooled there is formed a closed, solid or tough layer which at a certain distance from the cooled wall changes into a tough or viscous and finally fluid layer. It is, by controlling the degree of cooling, possible to determine the thickness of the solid, tough and viscous layers at will. Among the insulating substances for which water cooling suffices for creating a solid layer, there are particularly suited amongst the hydrocarbons e. g. paraffin (setting point 30° to 60° C.) and amongst the insulating difficultly combustible compounds e. g. a chlorinated hydrocarbon such as chlorinated diphenyl (setting point 20° C.). Paraffin is lighter and chlorinated diphenyl is heavier than the electrolyte, e. g. potash lye. The use of chlorinated diphenyl is particularly advantageous, e. g. in the case of water electrolyzers, particularly high-pressure decomposers as, in contrast to paraffin, it difficultly combines with oxygen and it is difficultly combustible so that the safety of operation is sensibly improved.

The application of the new method to a pressure decomposer of the above type will now be explained with reference to a plant diagrammatically shown in the drawing.

The pressure container $a$ enclosing the cell body is here surrounded by a cooling jacket $b$ through which e. g. water is passed in the case of chlorinated diphenyl. The chlorinated diphenyl (setting point 20° C.) filling the space between the cell body and the pressure container then solidifies on the inside wall of the container $a$ and forms a solid impervious insulating layer which is continuously renewed by the hot chlorinated diphenyl fed thereto. Close to the cell body $c$ however it is by the heat given up by the cell body maintained in a fluid condition. The emerging electrolyte, e. g. potash lye (sp. gr. about 1.3) migrates upwards in the fluid chlorinated diphenyl (sp. gr. 1.6) and separates in the usual expansion vessel above the chlorinated diphenyl level as at $d$. Preferably the pressure of one of the two gases produced, for instance hydrogen, is caused to act upon the chlorinated diphenyl level in order that the pressure balance is not disturbed by the expansion and contraction of the chlorinated diphenyl due to changing temperatures.

For the removal of the electrolyte penetrating from the cell body $c$ into the chlorinated diphenyl, a discharge branch $k$ adapted to be shut off is preferably connected to the expansion vessel $i$ below the level $d'$ of the electrolyte. The gases escaping from the cell body into the chlorinated diphenyl also enter the expansion vessel $i$ and are there carried off by the hydrogen flowing through the pipes $l$ and $m$.

The removal of this lye penetrating into the chlorinated diphenyl and also of the gas portions can be further promoted by an intense circulation of the chlorinated diphenyl.

This circulation may take place in part outside the vessel in pipes e and f which may up to a certain degree also be cooled (cooling jacket g) or heated (heating arrangement h). In a similar way any insulating substance brought into the cell body may be removed e. g. by the separation vessel n.

While I have described my invention in accordance with preferred embodiments, it is obvious that many changes and modifications may be made without departing from the spirit of the invention as defined in the following claim.

What I claim as my invention, and desire to secure by Letters Patent, is—

The method of insulating an aqueous bath electrolytic apparatus operated under condition of pressure, which includes enclosing the said pressure electrolyzer containing an aqueous potash electrolyte in a pressure container spaced apart from the said electrolyzer, filling the said space therebetween with an insulating material consisting of chlorinated diphenyl, the said chlorinated diphenyl being a liquid at the electrolyzing temperature and solid at room temperatures and having higher specific gravity than the said electrolyte, cooling the outer surface of said container by passing a cooling medium through a jacket surrounding said container and thereby cooling said container to such an extent that a solid or viscous layer of the said chlorinated diphenyl is maintained on the inner surface of the said container.

HANS NIEDERREITHER.